2,211,529

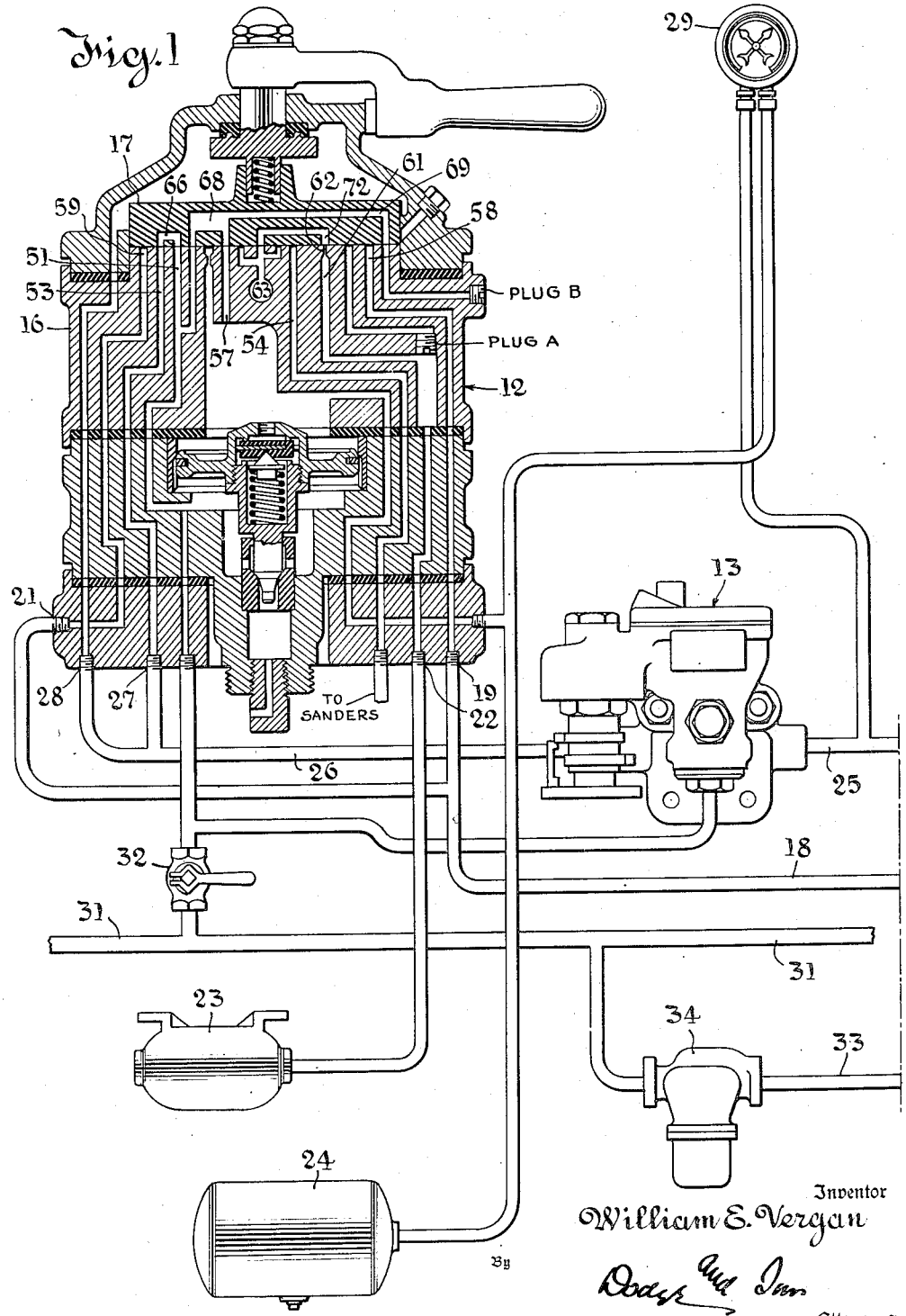

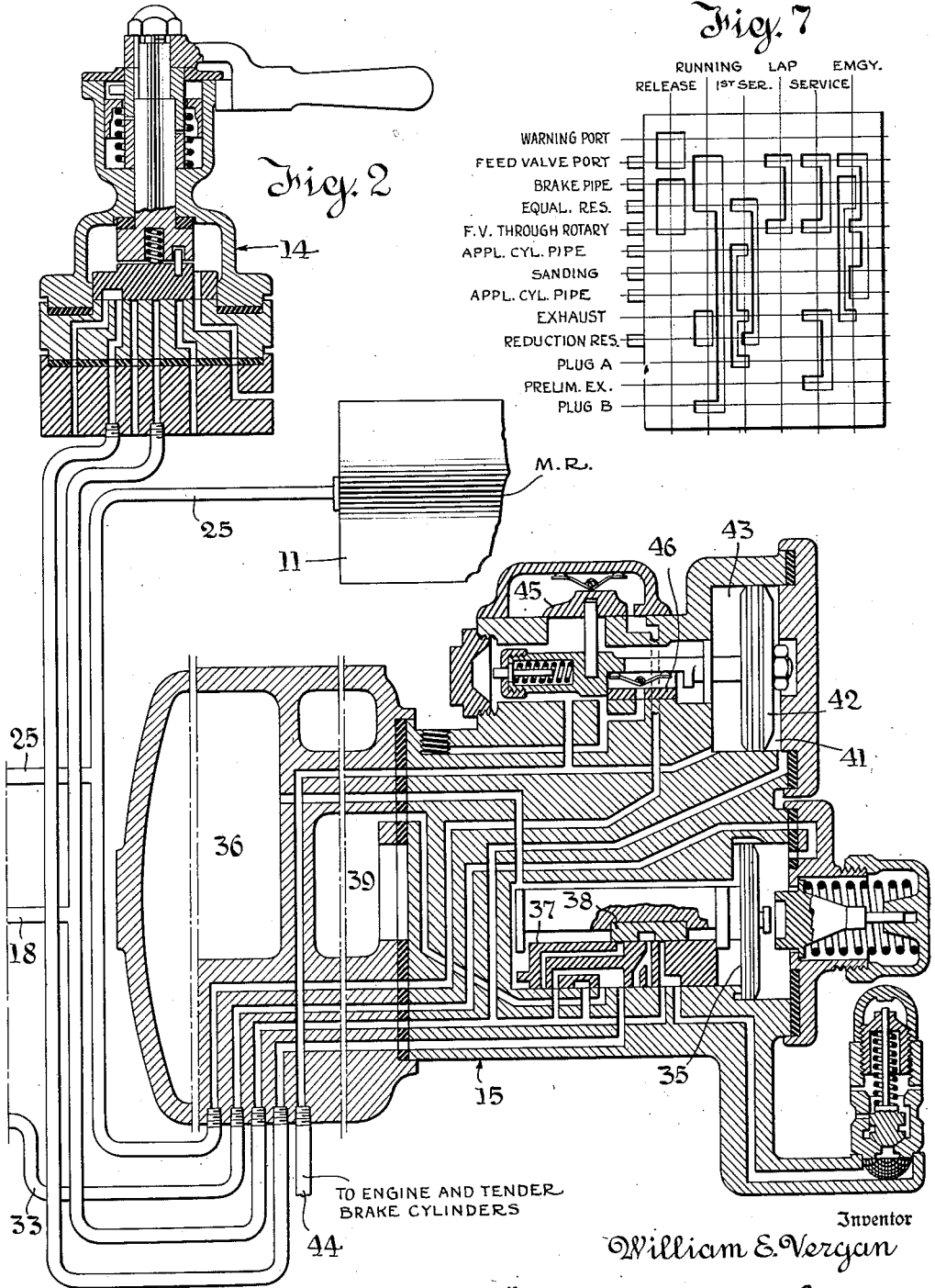

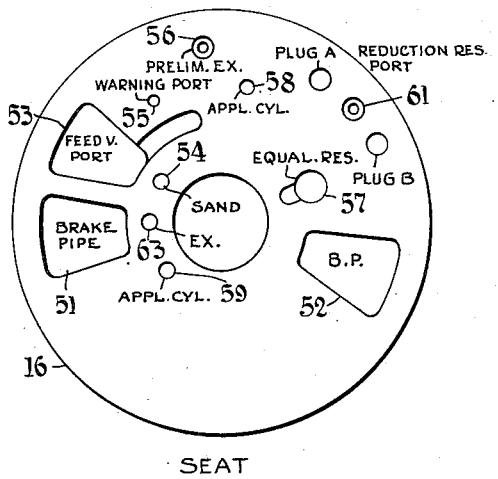
Fig. 3 SEAT
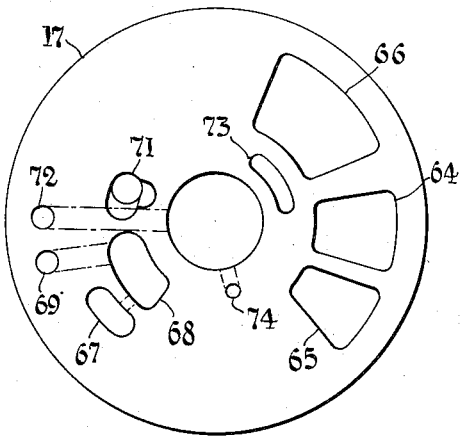
Fig. 4 ROTARY
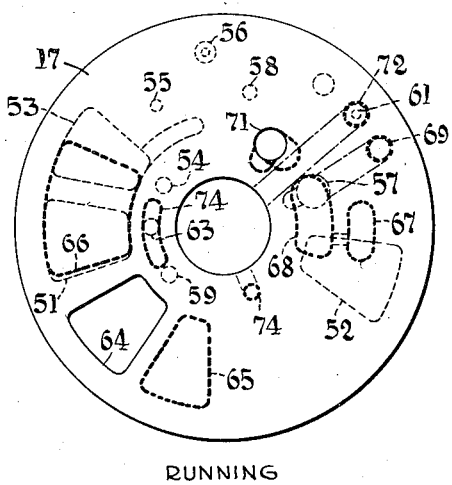
Fig. 5 RUNNING
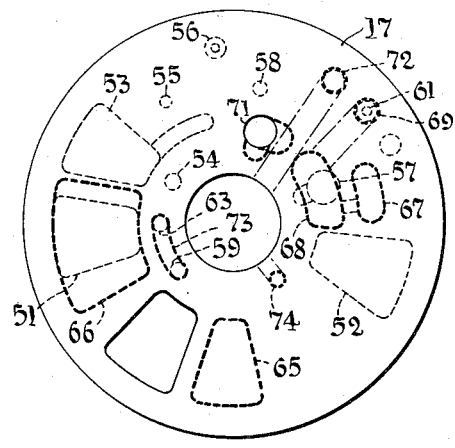
Fig. 6 1ST SERVICE Patented Aug. 13, 1940

UNITED STATES PATENT OFFICE 2,211,529

AIR BRAKE

William E. Vergan, Denison, Tex., assignor to The New York Air Brake Company, a corporation of New Jersey Application October 30, 1939, Serial No. 302,032

3 Claims. (Cl. 303—8)

This invention relates to air brakes for railway trains, and particularly to engineer's brake valves, designed particularly, but not necessarily exclusively, for freight service.

Modern freight trains are handled at high speeds, and it is not unusual to operate trains of fifty or more cars on schedules comparable with those for passenger trains. When the track gradients are favorable, such trains can be handled smoothly and satisfactorily with standard H-6 brake valves with 6 ET locomotive brakes and car equipments of the K or AB types, either alone, or the two mixed indiscriminately.

When, however, the track is "laid on the ground" in rolling country, a condition encountered on a few roads, the frequent "hog backs" cause violet running slack action. On such roads damage to equipment and lading is caused by running slack even though the slack action during braking is within tolerable limits.

The present invention, reduced to its simplest terms, contemplates a modification of the H-6 brake valve to produce special operating characteristics used to combat the effects of running slack.

The main reservoir connection to the space above the rotary valve is eliminated and the air to that space is supplied by the feed valve. Thus, release and running position supply air at feed valve pressure to the brake pipe, but the rate of supply is differentiated, as the result of changed porting of the rotary valve, so that the flow to the brake pipe is somewhat restricted in running position.

Holding position is converted into a limited service position (hereinafter called first service position), in which the equalizing reservoir is connected to a reduction reservoir, so that the equalizing discharge valve produces a definitely limited brake pipe reduction sufficient to produce a light service reduction. In this position the application cylinder of the ET distributing valve is vented through the engineer's brake valve, so that the limited service reduction above mentioned is effective to produce a light application on the cars but not on the locomotive.

Lap, service and emergency positions remain unchanged, so that ordinary service and emergency applications can be made in the conventional way. Since a large capacity feed valve is used, the rapid feed in release position gives certainty of release throughout the train and rapid recharge, while running position is adequate for normal charging and charge maintenance.

The brake valve is used to make a light train application when track conditions tend to cause the slack to run in. The locomotive and tender brakes do not apply, and prior to or concurrently with such application the engineer may open the throttle a few notches to assure what is called "a pulling throttle." In this way the slack is held stretched and violent running slack action is virtually eliminated.

Use of the device in actual service has demonstrated that its utility on those roads where the special conditions above set forth exist, compensates for the elimination of holding position. The large number of concurrent manipulations which would be required to secure approximately similar results with conventional equipment cannot be carried out with two hands.

With the special brake valve provided by the invention, the engineer opens the throttle slightly with one hand, shifts the brake valve to first service position with the other and need do nothing further. No manipulation of the independent brake valve is required; no gauges need be watched; he need not shift the brake valve to lap position even once. When ready, he can release brakes and recharge the system in the usual manner.

Since the peculiar track conditions above suggested require constant watch by the engineer, the simple manipulation afforded is a matter of decided practical importance and has greatly improved train handling when used in the manner above described for the special purpose stated.

In the drawings:

Figure 1 is a diagram of the engineer's brake valve and its connections, the valve being shown in vertical axial section in running position.

Figure 2 shows the main reservoir, independent brake valve and distributing valve, the independent brake valve and the distributing valve being shown in vertical axial section in running position. Everything shown in Figure 2 conforms strictly to the 6-ET equipment.

Figure 3 is a plan view of the seat for the rotary valve of the engineer's brake valve of Figure 1.

Figure 4 is a face view of the rotary valve.

Figure 5 is a diagram of the rotary valve of Figure 4 and the seat of Figure 3 in running position. The seat ports are indicated in light dotted lines, the cavities in the face of the rotary valve are indicated in heavy dotted lines and the ports extending through the rotary valve are drawn in full line.

Figure 6 is a similar diagram showing first service position.

Figure 7 is a conventionalized diagram indicating connections established in the various positions of the valve.

Note.—Figures 1 and 2, when assembled in the order stated, from left to right, produce a complete piping diagram for the locomotive.

The main reservoir is indicated at 11. The engineer's brake valve is indicated generally by the numeral 12. The feed valve which is of the large capacity type is indicated generally at 13. The independent brake valve is indicated generally at 14, and the ET distributing valve is indicated generally at 15.

The parts 11, 13, 14 and 15 correspond in detail to similar parts used in the 6 ET system. The engineer's brake valve 12 is an H-6 brake valve in all respects except that an especially ported seat element 16 and an especially ported rotary valve 17 are substituted for corresponding parts of the H-6 valve.

The connections to the engineer's brake valve 12 are modified to the following extent: The application cylinder pipe 18 has, in addition to its normal connection 19, a second connection 21 which in the H-6 valve is connected to the low pressure governor top. In this way, two ports connected to the application cylinder pipe are provided in the seat of the rotary valve, as will be hereinafter explained in detail.

A connection 22, which in the H-6 valve is connected with the distributing valve release port, is connected with a small volume reservoir 23 so dimensioned with relation to the usual equalizing reservoir 24 that if the reservoir 23 when at atmospheric pressure be connected with the equalizing reservoir 24, it will produce the desired light service reduction of pressure in the equalizing reservoir 24.

The main reservoir pipe 25 leads to the feed valve 13 and the feed valve connection 26 leads not only to the normal feed valve connection 27 of the engineer's brake valve but also to the connection 28 which in the normal H-6 equipment is connected directly to the main reservoir pipe. The effect of this is to supply air at feed valve pressure not only to the feed valve port in the seat of the rotary valve but also to the space above the rotary valve.

From this it follows that release and running positions in the present arrangement are not differentiated by the pressure at which air is supplied to the brake valve, although as will be hereinafter explained, they are differentiated as to the rate of flow which is afforded, a slower rate being afforded in running position than is afforded in release position.

The connection from the equalizing reservoir 24 to the engineer's brake valve conforms to practice with the H-6 valve and the gauge 29 is connected as usual so that one hand indicates main reservoir and the other indicates equalizing reservoir pressure at all times.

The brake pipe is shown at 31 and the normally open double heading cock at 32. The brake pipe, of course, runs throughout the train and has a branch connection 33 through a dust collector 34 with the usual brake pipe port in the distributing valve 15.

To avoid long, useless discussion of the well-known functions of the H-6 brake valve and the 6-ET locomotive brake equipment, reference is made to instruction pamphlet 5032 issued by the Westinghouse Air Brake Company November 1932, entitled "No. 6-ET Locomotive Brake Equipment." This equipment has been standard on American railroads for so long and is so familiar to persons skilled in the art that it appears unnecessary to do more than identify the main components.

Referring to Figure 2, since the independent brake valve takes no part in the functions characteristic of the present invention and since it conforms in every detail to past practice, suffice it to say that the novel functions of the present invention are performed with the independent brake valve in running position as shown and do not involve any manipulation of this valve.

The distributing valve 15 comprises an equalizing portion which includes an equalizing piston 35. This is interposed between a chamber to which brake pipe branch 33 connects and a pressure chamber 36. Piston 35 controls charging of the chamber from the brake pipe 33 and also actuates a main slide valve 37 and a graduating valve 38 in the usual manner and to perform familiar functions. One function is to establish in response to reduction in brake pipe pressure an appropriate pressure in the application chamber 39. This pressure then acts in the application cylinder 41 to cause the application piston 42 to establish a corresponding pressure in the chamber 43 which is connected with the pipe 44 which leads to the brake cylinders on the engine and tender. The piston 42 actuates an admission valve 45 which controls supply of main reservoir air to the brake cylinders and an exhaust valve 46 which alternatively releases air from the brake cylinders to atmosphere.

Referring now to Figure 3, 51 and 52 are brake pipe ports and 53 is the feed valve port to which the connection 27 leads. 54 is the sanding port. 55 is the warning port. 56 is the preliminary exhaust port and 57 is the port leading to the equalizing reservoir. 58 is the port leading to the application cylinder pipe. The two ports indicated by the legends "Plug A" and "Plug B" are ineffective because the plugs are in place, as indicated in Figure 1, and hence require no special discussion. All the ports in the valve seat 16 so far described conform to past practice in the H-6 valve.

The port 59 is located similarly to the port which in the H-6 valve is connected to the low pressure governor top, but as indicated in Figure 1, this leads by way of connection 21 to the application cylinder pipe 18. The port 61 corresponds in location to the port which in the H-6 valve is connected to the distributing valve release pipe. However, the port 61 which is provided with a restriction 62 (see Figure 1) is connected by way of connection 22 with the volume reservoir 23, already described.

The port 63 is an added exhaust port at the same radial distance from the center of the valve as the ports 54 and 59, previously mentioned.

In the rotary valve 17, (Figure 4) the through port 64 corresponds to the main reservoir port through which air at main reservoir pressure is supplied to the H—6 valve to the brake pipe. Because of the special connection 28 this port which registers with the port 51 in release position, supplies air at feed valve pressure to the brake pipe. The port 65 is the exhaust port which registers with port 52 in emergency position to vent the brake pipe. It has no other function.

The port 66 corresponds to that port in the H-6 valve which in running position connects the feed valve port 53 with the brake pipe port 51. However, the port is of reduced angular extent as compared to the corresponding port just mentioned, and as shown in Figure 5, registers only partly with the port 53 in running position, thus affording restricted flow at feed pipe pressure. It has no other function.

The cavity 67 is identical with a similar cavity in the H-6 valve and is in restricted communication with a cavity 68 which is similar to a corresponding cavity in the H—6 valve, but is so shortened that in first service position (see Figure 6), it does not open into the brake pipe port 52. Remembering that first service position corresponds to "holding" position, i. e. it is angularly the same as holding position in the H—6 valve, the reason for the change will be apparent.

The cavity 68 is connected through a passage in the rotary valve with a port 69 which in first service position, Figure 6, registers with the reduction reservoir port 61. It has no other function, although it does at times register with the plug A and plug B ports indicated by legends on Figure 3. It will be observed that in running position, the cavity 68 connects the brake pipe port 52 with the equalizing reservoir port 57 to ensure pressure equalization. In first service position (Figure 6), it affords, by way of port 69, a connection between the equalizing reservoir and the reduction reservoir. In emergency position, the ports 67 and 68, by way of their restricted intercommunication, afford a connection from the tail of the feed valve port 53 to the application cylinder port 58.

The through port 71, with its lateral extensions corresponds to a similar port in the H—6 valve. In release position, it charges the equalizing reservoir. In emergency position it connects the feed valve port 53 with the sanding port 54. The port 72 connects through the rotary valve to the center port and consequently to the exhaust port. It functions in running position to connect the reduction reservoir 23 to atmosphere, thus conditioning the reservoir to perform its measuring function in first service position. Port 72 has a further function in service position of registering with the preliminary port 56.

Referring to Figure 4, the arcuate groove port 73 is so located that in first service position (Figure 6) it connects the application cylinder port 59 with the exhaust port 63. It has no other function. Port 74 is an exhaust port leading to the center of the rotary valve and hence to the central exhaust port. In emergency position, it engages the extension of the port 57 and provides for venting the equalizing reservoir.

The various connections established are diagrammed in Figure 7, according to a convention well understood in the art. Hence, the figure is deemed to be self-explanatory, in connection with the following general statement.

In release position, feed valve air flows at an unrestricted rate through the port 64 to the brake pipe port 51. The port 71 registers with the port 57 so that the equalizing reservoir is charged. Air flows from the feed valve port 53 to the warning port 55 by way of cavity 66. Thus, the brake pipe is charged and the brakes are released by rapid flow of air to the brake pipe under feed valve pressure.

In running position, the charge of the brake pipe is built up at a restricted rate and maintained by restricted flow from port 53 by way of cavity 66 to port 51. At the same time, the equalizing reservoir is charged from the brake pipe port 52 via cavity 68 to port 57. Also at the same time the reduction reservoir port 61 is connected to atmosphere by the exhaust port 72.

In first service position, the reduction reservoir port 61 and the equalizing reservoir port 57 are connected by way of ports 68 and 69. At the same time, the application cylinder pipe is connected to exhaust by way of port 59 through port 73 and exhaust port 63.

The above three positions are the only ones which are materially affected by the changes in porting of the valve seat and its rotary valve.

In lap position, the through port 71 does register with the tail of the feed valve port 53 and this connection is maintained in service position, but has no functional significance. No other connection is established in lap position.

In service position, the connection just mentioned is maintained and the preliminary exhaust port 56 is connected to atmosphere by the port 72.

In emergency position, the port 65 connects the brake pipe port 52 to atmosphere and the port 74 vents the equalizing reservoir to atmosphere because of registry with the port 57. At this time, the port 71 registers with the feed valve port 53 and the sanding port 54, providing for sanding. At the same time, the cavity 68 registers with the tail of the feed valve port 53 and provides a restricted communication with the application cylinder port 58.

Thus, by a simple change in two components of the engineer's brake valve, and simple changes in the piping connections between the engineer's brake valve and the feed valve, and between the engineer's brake valve and the application cylinder pipe, the desired special functions are secured; i. e., in release position, rapid charge of the brake pipe through a large capacity feed valve; in running position, more restricted charging flow, together with the venting of the reduction chamber 23; in first service position, which corresponds to the former holding position, the measured reduction of equalizing reservoir pressure produced by connecting a measuring reservoir with the equalizing reservoir.

The effect of this is to produce a limited service reduction in the brake pipe through the response of the equalizing discharge valve, but this brake pipe reduction is prevented from applying the locomotive and tender brakes because in first service position the application cylinder port 59, especially provided, is connected to atmosphere.

Lap, service and emergency positions involve the same functions that were secured with the prior art arrangements. By moving the engineer's brake valve from running to first service position and leaving it there, a measured light application can be made throughout the train but without affecting the locomotive and tender brakes, for the purpose mentioned. This application can be had without repeated manipulation of the engineer's brake valve, without any manipulation of the independent brake valve, and without observation of any gauges or other instruments.

The above results have been secured without impairing or changing the normal functions of the independent brake valve.

What is claimed is:

1. In an automatic air brake system the combination of a source of pressure fluid; a brake pipe; a distributing valve having an equalizing portion connected with the brake pipe, an application portion normally controlled thereby and in turn controlling engine brakes, and a release connection which, when vented, serves to inhibit application of the engine brakes by said application portion irrespective of the action of said equalizing portion; and an engineer's brake valve connected with said source and said brake pipe and having a limited service position in which it functions to reduce brake pipe pressure by a definite amount and to vent said release connection.

2. In an automatic air brake system the combination of a source of pressure fluid; a brake pipe; a distributing valve connected with the brake pipe and source and arranged to control engine brakes, said distributing valve having a normally closed application cylinder release connection; and an engineer's brake valve of the equalizing discharge type connected with said source and brake pipe and including an equalizing chamber and a reduction chamber, said brake valve having release, running, lap, service, and emergency positions for controlling brake pipe pressure, and including means to vent the reduction chamber in at least running position, said brake valve having also a limited service position in which the brake valve connects said equalizing chamber with said reduction chamber and interrupts venting of the latter, and in which the brake valve vents the application cylinder release connection.

3. In an automatic air brake system, the combination of a source of pressure fluid; a brake pipe; a distributing valve connected with the brake pipe and said source and arranged to control engine brakes, said distributing valve having a normally closed application cylinder release connection; and an engineer's brake valve unit of the equalizing discharge type connected with said source and brake pipe and with said release connection and including an equalizing chamber, a reduction chamber and a feed valve interposed between the source and the brake valve, said brake valve having at least six functional positions arranged in the following sequence: release position in which the feed valve supplies charging air to the brake pipe without material flow restriction and to the equalizing chamber; running position in which the aforesaid charging flows occur, that to the brake pipe being restricted, and the reduction chamber is connected to atmosphere; limited service position in which all charging flows are interrupted, the equalizing and reduction chambers are connected with each other and the application release connection is vented; lap position in which the flow paths are closed; service position in which all charging flows are interrupted and the equalizing chamber is in restricted communication with atmosphere; and emergency position in which all charging flows are interrupted and the brake pipe is freely vented to atmosphere.

WILLIAM E. VERGAN.